(12) United States Patent
Shimizu

(10) Patent No.: US 7,595,818 B2
(45) Date of Patent: Sep. 29, 2009

(54) IMAGE SHAKE CORRECTION IMAGE PROCESSING APPARATUS AND PROGRAM

(75) Inventor: Hiroshi Shimizu, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 393 days.

(21) Appl. No.: 11/592,828

(22) Filed: Nov. 3, 2006

(65) Prior Publication Data
US 2007/0103556 A1 May 10, 2007

(30) Foreign Application Priority Data
Nov. 8, 2005 (JP) .............................. 2005-323575

(51) Int. Cl.
H04N 5/228 (2006.01)
(52) U.S. Cl. .............................. 348/208.99; 348/208.4; 348/208.14
(58) Field of Classification Search ............ 348/208.99, 348/208.4, 208.14
See application file for complete search history.

(56) References Cited
U.S. PATENT DOCUMENTS
5,497,191 A * 3/1996 Yoo et al. ................ 348/208.6
5,614,945 A * 3/1997 Sekine et al. ........... 348/207.99
5,926,212 A * 7/1999 Kondo .................... 348/207.99
7,012,635 B2 * 3/2006 Umeda et al. ............ 348/208.4

FOREIGN PATENT DOCUMENTS
JP 2004-15376 A 1/2004

* cited by examiner

Primary Examiner—James M Hannett
(74) Attorney, Agent, or Firm—Frishauf, Holtz, Goodman & Chick, P.C.

(57) ABSTRACT

An image processing apparatus comprising: a block selector that selects one of blocks that contain an amount of features, larger than a predetermined amount of features, from among a plurality of blocks which compose a particular one of a plurality of frames of a moving image of a subject; a motion calculator that calculates a motion vector of each of blocks of a second particular one of the plurality of frames next to the first-mentioned particular frame and corresponding to a respective one of the selected blocks; a displacement calculator that calculates a displacement of the second particular frame based on the calculated motion vectors; and an image shake corrector that corrects an image shake in the moving image based on the calculated displacement.

4 Claims, 6 Drawing Sheets

IMAGE SHAKE CORRECTION IMAGE PROCESSING APPARATUS AND PROGRAM

BACKGROUND OF THE INVENTION

1. Field of the Invention

The present invention relates to image processing apparatus and program for correcting an image shake in a moving image.

2. Related Art

An image shake preventing apparatus is hitherto known which detects an image shake due to camera shake with an image sensor such as a CCD or a CMOS and corrects the image shake (for example, see Unexamined Japanese Patent Publication 2004-15376). This apparatus calculates a range of magnitudes of motion vectors to be selected in respective areas, which compose each of image frames which in turn compose a captured image, based on the average value and standard deviation of the motion vectors and selects only motion vectors present in the selected range of magnitudes. Furthermore, the apparatus calculates a contrast coefficient for motion vectors in each area, a weighing coefficient based on the contrast coefficient, and an average of the motion vectors weighted with the weighting coefficient in each area, which is used as a total motion vector in that area. Thus, the reliability of the total motion vector is evaluated and the total motion vector can be calculated appropriately.

However, since in this apparatus it is determined whether or not the calculated motion vectors are appropriate for calculating the total motion vector, the motion vectors of a subject image inappropriate for calculating the total motion vector will also be calculated necessarily. Thus, the efficiency of the image shake correction is low.

We can use a method of calculating motion vectors of macroblocks of a frame estimated to be appropriate for calculating a total motion vector as a result of analysis of the distinctive attributes of a subject and then calculating a total motion vector based on the motion vectors of the macroblocks. This method is improved in prevention of needless vector calculation. Since in this method analysis of the subject, or determination of whether or not each macroblock is appropriate for calculating the total motion vector, is still required as a prestep, it is difficult to reduce the series of processing times greatly.

For example, as shown in FIGS. 7 and 8, a conventional image capture apparatus 200 comprises an image capturer 201 that captures a moving image and converts the image to electronic image data, a feature detector 202 that detects the features of an image based on the image data and calculates the amount of the features, a block selector 203 that selects a block appropriate for calculating a displacement of the frame, a motion calculator 204 that calculates a motion vector from each of the selected blocks, a displacement corrector 205 that corrects the displacement of that frame based on the calculated motion vectors, an encoder 206 that encodes resulting corrected image data, and a display 207 that displays a resulting captured moving image.

In the image capture apparatus 200, in order to ensure a predetermined frame rate when a moving image is captured, a series of processing steps such as amount-of-features calculation, block selection, moving vector calculation and displacement correction, ranging from the exposing step to the encoding and displaying steps (steps A1-A6), must be performed in a predetermined time (see FIG. 8). However, if such series of processing steps are performed sequentially, a considerable processing time is required from determination of an offset in one frame to clipping of predetermined image data. Thus, there is the problem with this apparatus that the drive frequency of a CPU concerned must be increased and that a working memory must be provided additionally.

SUMMARY OF THE INVENTION

It is therefore an object of the present invention to provide an image processing apparatus and program that reduces the time required from the start of the moving image capture to the termination of the image shake correction in each of frames that composes the moving image, thereby accommodating appropriately to an increasing frame rate of the moving image.

In one aspect, the present invention provides an image processing apparatus comprising: a feature detector that detects features, and calculates the amount of features, of an image in each of blocks that compose one of a plurality of frames which in turn compose a moving image of a subject; a block selector that selects blocks that contains a amount of features, larger than a predetermined amount of features, detected by the feature detector from among the plurality of blocks of the particular frame; a motion calculator that calculates a motion of each of blocks of a second particular one of the plurality of frames next to the particular frame and corresponding to a respective one of the blocks selected by the block selector; a total motion vector calculator that calculates a total motion vector of the above-mentioned next frame based on the motions of the respective blocks of the second particular frame calculated by the motion calculator; and an image shake corrector that corrects an image shake in the moving image based on the total motion vector calculated by the total motion vector calculator.

At least one of the feature detector and the motion calculator may perform its operation such that a received amount of image data to be processed does not exceed the amount of the image data to be processed.

In another aspect, the present invention provides an image processing program that causes a computer to perform the functions of detecting features, and calculating the amount of features, of an image in each of blocks that compose one of a plurality of frames which in turn compose a moving image of a subject; selecting blocks that contains a calculated amount of features, larger than a predetermined amount of features, from among the plurality of blocks of the particular frame; calculating a motion of each of blocks of a second particular one of the plurality of frames next to the first-mentioned particular frame and corresponding to a respective one of the selected blocks; calculating a total motion vector of the second particular frame based on the calculated motions of the respective selected blocks of the second particular frame; and correcting an image shake in the moving image based on the calculated total motion vector.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiments given below, serve to explain the principles of the present invention in which.

DETAILED DESCRIPTION OF THE INVENTION

Figure 1:
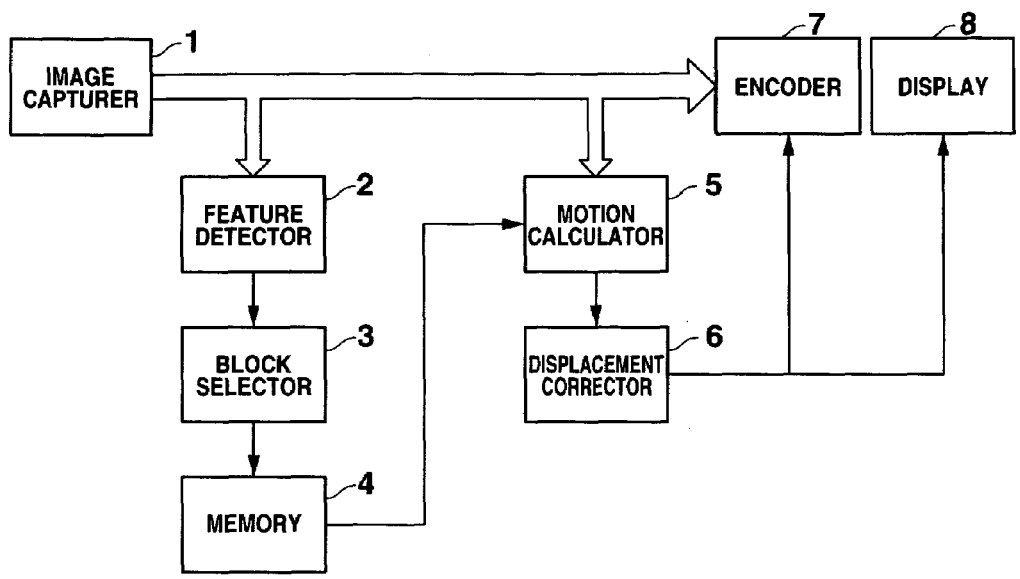
FIG. 1 is a block diagram of an essential part of an image capture apparatus illustrated as an embodiment of an image processing apparatus according to the present invention.

An embodiment of the present invention will be described with reference to the drawings. FIG. 1 is a block diagram of an essential part of an image capture apparatus 100 illustrated as an embodiment of an image processing apparatus according to the present invention.

The image capture apparatus 100 is applied, for example, to a digital camera, and captures a moving image of a subject and encodes a captured moving image in accordance with an information compression system such as MPEG 4 which is encoding standards to record the captured moving image. More specifically, as shown in FIG. 1, the image capture apparatus 100 comprises an image capture unit 1 that captures a still or moving image of a subject by converting its captured optical image to electric image data, a feature detector 2 that calculates the amount of features of the image data, a block selector 3 that selects from among a plurality of blocks that compose a frame F a block B1 (see FIG. 2) that contains an amount of features larger than a predetermined amount of features appropriate for calculating a displacement of the frame F, a memory 4 that stores information on the selected block B1, a motion calculator 5 that calculates a motion vector from the information on the block B1, a displacement corrector 6 that calculates a displacement amount of the frame F based on the motion vector calculated by the motion calculator 5 and corrects the displacement amount, an encoder 7 that encodes the image data, which is corrected by the displacement corrector 6, in accordance with a predetermined information compression system, and a display 8 that displays a resulting captured moving image.

The image capturer 1 captures one of a still image and a moving image by operating a changeover switch (not shown). More specifically, the image capturer 1 comprises an image capture lens group having focus and zoom functions, an electronic image capturer that comprises a CCD or a CMOS that converts an optical image of a subject that has passed through the image capture lens group due to exposure to two-dimensional image data, a signal processor that performs a predetermined image processing step on the image data received from the electronic image capturer, and an image capture controller that controls the electronic image capturer and the signal processor, although these elements are not shown. The image data is forwarded from the signal processor to the feature detector 2 and the motion calculator 5 under control of the image capture controller.

The feature detector 2 detects features of each of frames that compose a moving image received from the image capturer 1 by performing a predetermined operation on the frame F, and then calculates the amount of features of the frame. More specifically, the feature detector 2 reads each of a plurality of blocks that compose a respective one (for example, F1) of a plurality of frames F, which compose a captured image, stored in the memory 4, which may, for example, include an image memory. The feature detector 2 then detects the amount of features, which includes, for example, intersections of lines, patterns and/or vertexes of an object, in a specified image area (or block) of the image, which can easily specify a difference between the frame F1 and a next frame.

Figure 2:
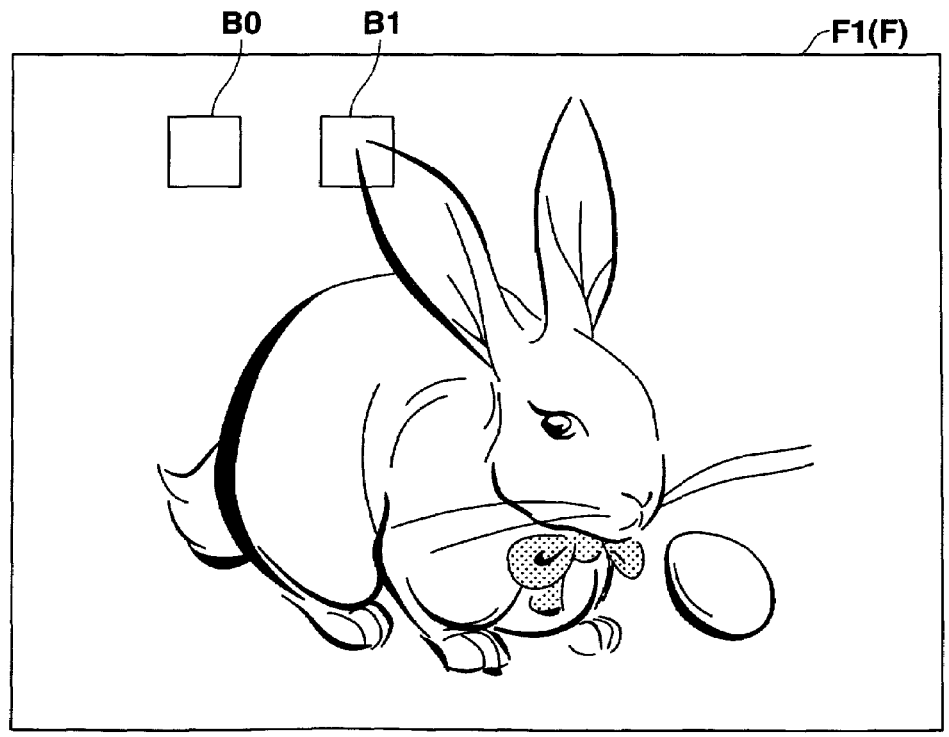
FIG. 2 schematically illustrates a frame involving macroblocks to be processed in an image shake correction by the image capture apparatus of FIG. 1.

The block selector 3 selects each block B1 (see FIG. 2) which contains an amount of features larger than a predetermined amount of features from among a plurality of blocks that compose a frame F. As shown in FIG. 2, the block B1 selected by the block selector 3 contains an image of a tip of a subject and hence is appropriate for calculation of a motion vector by the motion calculator 5. A block B0, whose amount of features is small, such as an expressionless background is not appropriate for calculation of a motion vector because a wrong motion vector may be calculated. The block selector 3 forwards block information including the coordinates of the selected block B1 to an image clipper 9 (see FIG. 5).

The image clipper 9 is composed, for example, of a memory controller that controls outputting image data on the frame F stored in the memory 4 to the motion calculator 5, encoder 7 and display 8. More specifically, the image clipper 7 calculates an image area of a block B2 corresponding to the block B1 from a frame F2 (hereinafter referred to as present frame F2) next to the frame F1 (hereinafter referred to as reference frame F1) selected by the block selector 3 and corresponding to the block B1 of the frame 1 based on the block information on the reference frame F1 received from the block sector 3 (see FIG. 5). The information on the calculated image area is clipped and forwarded to the memory 4.

The memory 4 comprises, for example, an image memory that stores image data received from the image capturer 1 after subjected to predetermined image processing by the image capturer 1. The memory 4 also stores information on the image area received from the image clipper 9. Further, the memory 4 temporarily stores image data on the present frame F2 subjected to displacement correction by a displacement corrector 6 to be described later in more detail.

Figure 3:
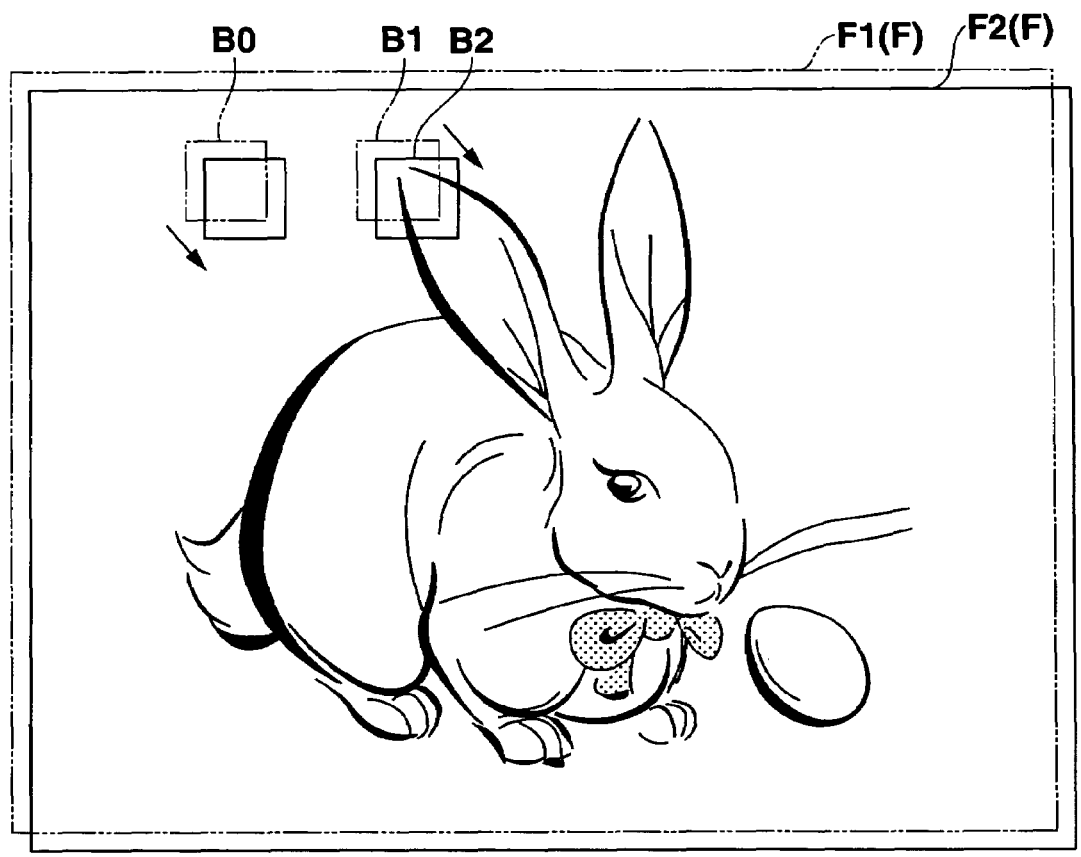
FIG. 3 schematically illustrates calculation of motion vectors.

The motion calculator 5 calculates a motion vector (or motion) of the block B2 of the present frame F2 corresponding to the block B1 of the frame F1 selected by the block selector 3 of the reference frame F1. In this case, it is assumed that there is no significant change between corresponding blocks of adjacent frames appropriate for calculating a total motion vector (or displacement) of a particular frame F. Thus, when the total motion vector of the present frame F2 is calculated, the block B1 of the preceding reference frame F1 is used. More specifically, the motion calculator 5 detects a block B2 of the present frame F2 where a difference between the blocks B2 and B1 is minimum in the image area of the present frame F2 corresponding to that of the selected block B1, based on the image data on the selected block B1 of the preceding reference frame F1 and image data on a corresponding image area of the present frame F2 read from the memory 4. Then, the motion calculator 5 calculates a motion vector indicative of the amount of movement of the detected block B2 in horizontal and vertical directions (see FIG. 3).

The displacement corrector 6 comprises a displacement calculator 61 that calculates a displacement indicative of a total motion vector of the present frame F2 by averaging the motion vectors of the plurality of blocks of the present frame F2 calculated by the motion calculator 5, and an offset calculator 62 that calculates an offset of the present frame F2 relative to the reference frame 1 based on the calculated displacement. Data on the calculated offset of the present frame F2 is then forwarded to the image clipper 9, which moves (or corrects) the present frame F2 by the offset relative to the preceding frame F1, and clips an image area of the present frame F2 equal to the display area of the display 8. The displacement corrector 6 and the image clipper 9 compose a displacement corrector that corrects a displacement of a moving image based on the respective motion vectors of the feature blocks B1 calculated by the motion calculator 5.

The image clipper 9 forwards the corrected image data of the present frame F2 to the memory 4, which stores the image data temporarily, and then forwards the image data to the encoder 7 and display 8 at predetermined times.

The encoder 7 encodes moving image data in accordance with an information compression system that performs motion compensation such as, for example, MPEG 4. More specifically, the encoder 7 performs motion compensation that reduces the code amount of moving image data received from the displacement corrector 6, using a time correlation between the frames F composing the moving image, and an information compression/encoding step such as DCT (Discreet Cosine Transform) that reduces the code amount of the image data using a spatial correlation between the frames F. The encoder 7 may quantize a DCT conversion coefficient calculated in DCT with a predetermined Q value in consideration of a visual characteristic.

The display 8 is composed, for example, of a liquid crystal display that displays a moving image based on the moving image data, whose displacement is corrected, received from the displacement corrector 6. The display 8 may also receive uncorrected moving image data, and display a corresponding moving image.

Figure 4:
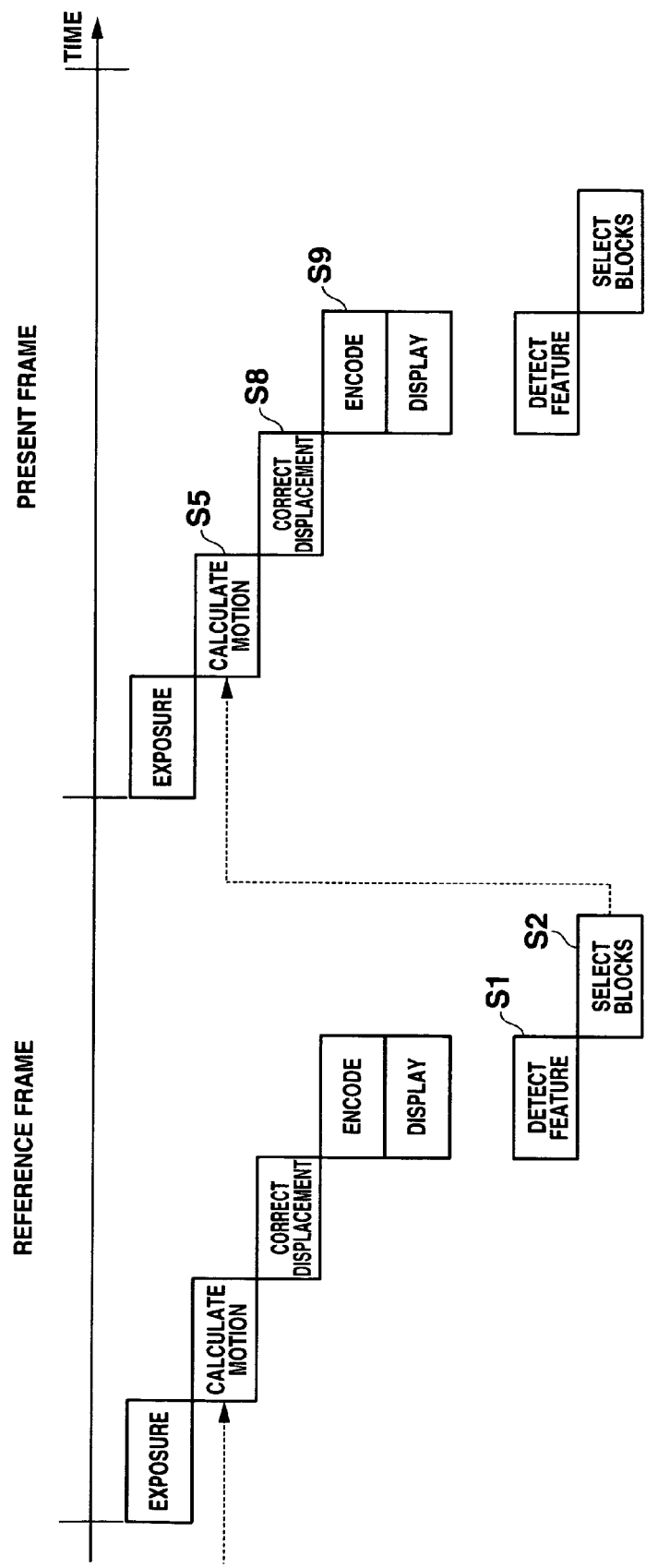
FIG. 4 schematically illustrates relations of each steps of image shake correction on continuous two frames.
Figure 5:
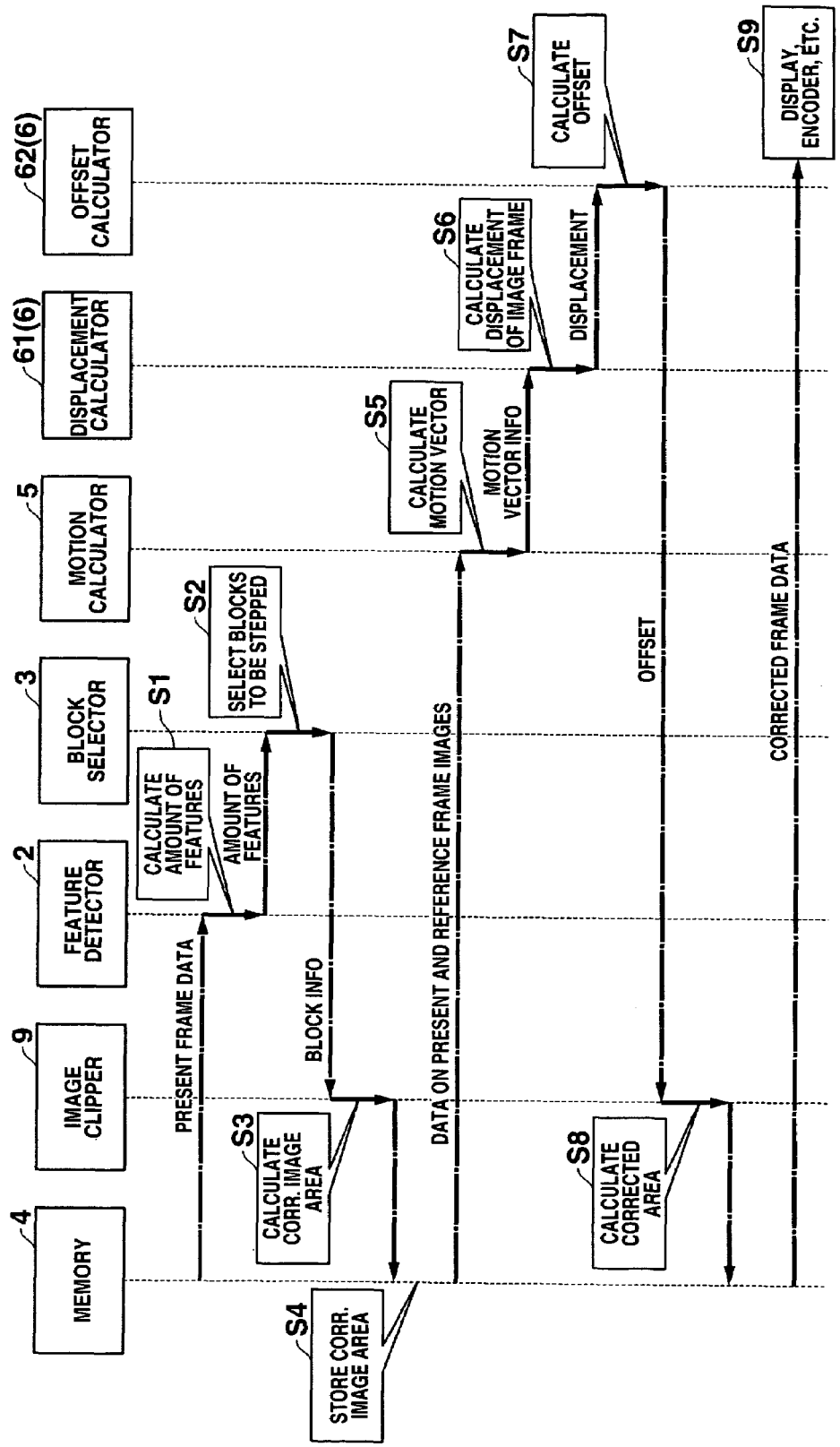
FIG. 5 is a sequence chart of the image shake correction to be performed by the FIG. 1 image capture apparatus.

The displacement correcting step will be described with reference to FIGS. 4 and 5. FIG. 4 schematically illustrates one example of the displacement correcting step. FIG. 5 is another illustration of the displacement correcting step. In the following description, the motion vector calculating step, the displacement correcting step, the encoding step and the displaying step for the reference frame F1 are substantially the same as those for the present frame F2, and further description thereof will be omitted. In FIG. 4, the horizontal axis represents a time axis and each of divisions of the time axis represents a processing period for a respective frame F.

As shown in FIGS. 4 and 5, first, a feature detecting step is performed on the reference frame F1 (steps S1). More particularly, when one (hereinafter referred to as reference frame F1) of frames F that compose a moving image captured by the image capturer 1 and stored in the memory 4 is read and forwarded to the feature detector 2, the feature detector 2 detects, and calculates the amount of, features of each of blocks that compose the reference frame F1 and then calculates the amount of features. Then, the block selector 3 selects a predetermined number of blocks B1, which each contain an amount of features larger than a predetermined amount of features from among the blocks that compose the reference frame F1 (step S2).

When the image clipper 9 receives block information including coordinates of each selected block B1 from the block selector 3, the image clipper 9 calculates or clips an image area that contains a block B2 of the present frame F2 next to the reference frame F1 corresponding to the selected block B1 of the frame F1 (step S3). When the image area is calculated, the image clipper 9 forwards the information on the image area to the memory 4, which then stores the information temporarily (step S4).

The motion calculator 5 then performs a motion calculating step on the present frame F2 (step S5). More particularly, the motion calculator 5 calculates a motion vector of a block B2 of the present frame F2 corresponding to each selected block B1 of the preceding reference frame F1 read from the memory 4 based on the image data on the selected block B1 and the image data on the image area of the block B2. When the motion vectors of the blocks B2 are calculated, the displacement calculator 61 of the displacement corrector 6 averages the motion vectors of a predetermined number of blocks B2, thereby calculating a displacement of the present frame F2 from the reference frame F1 (step S6). Then, the offset calculator 62 calculates an offset of the present frame F2 relative to the frame F1 based on the calculated displacement of the frame F2 (step S7).

Then, when the image clipper 9 receives data on the calculated offset from the offset calculator 62, the image clipper 9 moves or corrects the present frame F2 by the amount of the offset relative to the reference frame F1, and clips an image area of the present frame F2 equal to the display area of the display 8 (step S8).

Then, data on the present frame F2 whose displacement is corrected at a predetermined time is forwarded from the image clipper 9 to the encoder 7 and the display 8, which then perform encoding and displaying steps, respectively, on the present frame F2 data (step S9). When the above processing steps are sequentially performed on the respective ones of the plurality of frames F that compose the moving image, a moving image whose image shake is corrected is obtained.

As described above, according to the image capture apparatus 100 of this embodiment, among a plurality of frames F that compose a moving image of a subject a motion vector of a block B2 of the present frame F2 corresponding to each selected block B1 of a reference frame F1 is calculated and the total motion vector of the frame F2 is calculated. That is, the total motion vector of the present frame F2 can be calculated based on the calculated amount of features of the blocks of the reference frame F1. Thus, the time required from the reception of the image data of the present frame F2 to the termination of the displacement correcting step is reduced compared to the conventional image processing apparatus which sequentially performs the respective processing steps ranging from the exposing step to the encoding step.

The motion calculating step and the amount of features calculating step involving each of the plurality of frames F can be performed in parallel. Thus, when these processing steps are performed sequentially on the respective ones of the plurality of frames, the time required for performing the processing steps ranging from the start of the image capture to the termination of the displacement correcting step of all of the frames F that compose the moving image is reduced. Thus, the drive frequency of the image capture apparatus 100 and hence its power consumption are reduced. The image capture apparatus 100 also can appropriately accommodate to an increasing frame rate of the moving image.

Figure 6:
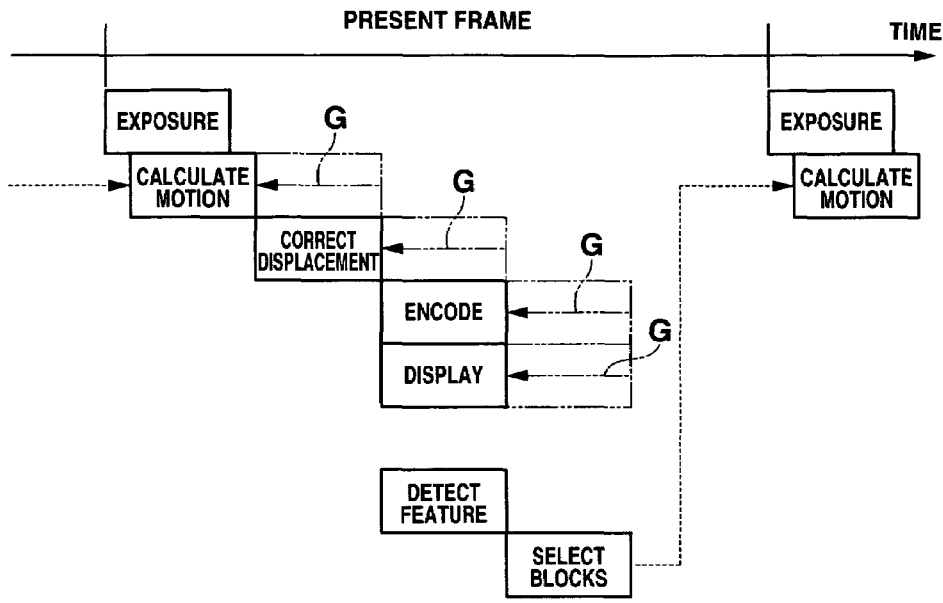
FIG. 6 illustrates a modification of the image shake correction to be performed by the FIG. 1 image capture apparatus.
Figure 7:
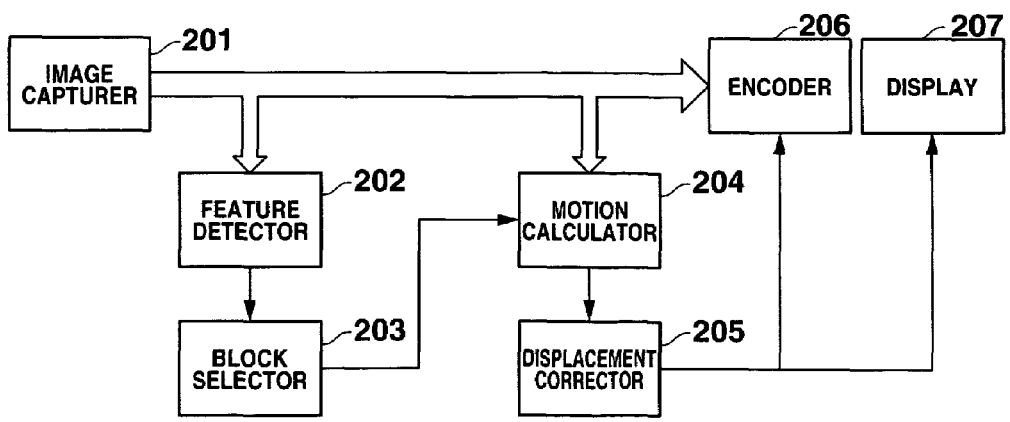
FIG. 7 is a block diagram indicative of the composition of an essential part of a conventional image capture apparatus.
Figure 8:
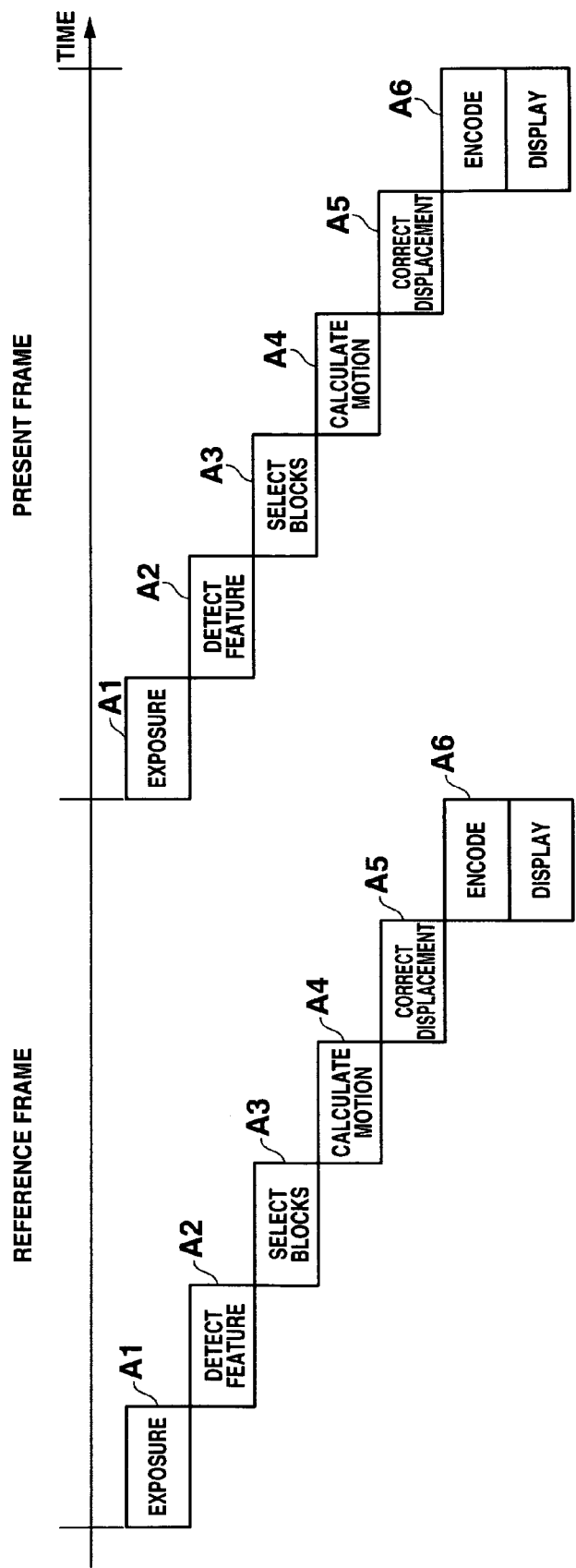
FIG. 8 schematically illustrates an image shake correction to be performed by the FIG. 7 conventional image capture apparatus.

While in the embodiment the motion calculator 5 is illustrated as calculating the motion vectors of the blocks of the present frame F2 after the exposing step is terminated, or all the image data of the present frame F2 is acquired, the motion calculating step by the motion calculator 5 and the exposing step may be performed in parallel, for example, as shown in FIG. 6.

More specifically, the motion calculator 5 performs a motion vector calculating step such that a received amount (or, for example, count) of image data of a block on which the motion vector calculating step is performed is not exceeded by an amount (or, for example, count) of image data processed by the motion calculator 5. Thus, each time image data of a predetermined number of blocks is acquired in the exposing step from among all the blocks that compose the present frame F2, the motion calculator 5 can perform the motion calculating step on that image data. That is, the motion calculating step can start slightly delayed from the beginning of the exposing step without waiting for the termination of the exposing step, thereby bringing forward the respective ending times of the motion vector calculating step and subsequent processing steps by a time indicated by a two-dot-chain line arrow G in FIG. 6. As a result, the time required from the beginning of the exposing step to the termination of the encoding step/displaying step of the present frame F2 is reduced.

While the motion calculating step and the exposing step are illustrated as performed in parallel in the displacement correcting step of FIG. 6, the exposing step and the amount of features calculating step may be performed in parallel or the amount of features calculating step and the motion calculating step may be performed in parallel with the exposing step. The step in parallel with which one or both of the motion calculating step and the amount of features calculating step can be performed is not limited to the exposing step, but may be any step which is performed before the motion calculating step and the amount of features calculating step are performed.

Furthermore, when an encoded moving image file stored in the memory 4 is decoded and reproduced for displaying purposes without being subjected to the displacement correction, the image data decoding step may be performed in parallel with the motion calculating step and the amount of features calculating step, thereby reducing the time required from decoding the encoded moving image file to reproduction of a moving image whose image shake is corrected.

While in the embodiment the image capture apparatus 100 that captures an image of a subject and displays or reproduces the captured still or moving image is illustrated, any apparatus capable of performing at least a predetermined image processing operation on a captured moving image may be employed instead. For example, the present invention may be embodied by a personal computer as an image processing apparatus that captures a moving image file, calculates the amount of features, selects blocks that contain an amount of features larger than a predetermined amount of features, calculates motion vectors of the blocks, calculates a total motion vector and corrects an image shake in the moving image.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-323575 filed on Nov. 8, 2005 and including specification, claims, drawings and summary. The disclosure of the above Japanese patent application is incorporated herein by reference in its entirety.

What is claimed is:

1. An image processing apparatus comprising:
   a feature detector that detects features of an image in each of a plurality of blocks that form each of a plurality of frames which in turn compose a moving image of a subject;
   a block selector that selects blocks of a first one of the frames that contain an amount of the detected features that is larger than a predetermined amount;
   a motion calculator that calculates a motion of respective blocks of a following second one of the frames which correspond to the selected blocks of the first one of the frames;
   a total motion vector calculator that calculates a total motion vector of the second one of the frames based on the calculated motions of the respective blocks;
   an image shake corrector that corrects an image shake in the moving image based on the total motion vector calculated by the total motion vector calculator; and
   an encoder which encodes the moving image corrected by the image shake corrector for display;
   wherein the feature detector and the encoder are controlled to operate in parallel.

2. The image processing apparatus of claim 1, wherein at least one of the feature detector and the motion calculator is controlled to operate such that a received amount of image data to be processed does not exceed a predetermined amount.

3. An image processing method comprising:
   detecting, using an image processor, features of an image in each of a plurality of blocks that form each of a plurality of frames which in turn compose a moving image of a subject;
   selecting blocks of a first one of the frames that contain an amount of the detected features that is larger than a predetermined amount;
   calculating a motion of respective blocks of a following second one of the frames which correspond to the selected blocks of the first one of the frames;
   calculating a total motion vector of the second one of the frames based on the calculated motions of the respective blocks;
   correcting an image shake in the moving image based on the calculated total motion vector;
   encoding the corrected moving image for display; and
   controlling the detecting and encoding operations to be performed in parallel.

4. A computer readable medium having stored thereon a program for performing functions comprising:
   detecting, using an image processor, features of an image in each of a plurality of blocks that form each of a plurality of frames which in turn compose a moving image of a subject picked up by an image capture apparatus;
   selecting blocks of a first one of the frames that contain an amount of the detected features that is larger than a predetermined amount;
   calculating a motion of respective blocks of a following second one of the frames which correspond to the selected blocks of the first one of the frames;
   calculating a total motion vector of the second one of the frames based on the calculated motions of the respective blocks;
   correcting an image shake in the moving image based on the calculated total motion vector;
   encoding the corrected moving image for display; and
   controlling the detecting and encoding operations to be performed in parallel.

* * * * *